(12) United States Patent
Brunet et al.

(10) Patent No.: US 6,660,895 B1
(45) Date of Patent: Dec. 9, 2003

(54) PROCESS FOR THE PRODUCTION OF AROMATIC COMPOUNDS IN A MOVING BED INCLUDING A REDUCTION OF THE CATALYST

(75) Inventors: Francois-Xavier Brunet, Istres (FR); Olivier Clause, Chatou (FR); Jean-Marie Deves, Vernouillet (FR); Eric Sanchez, Rueil Malmaison (FR); Frederic Hoffmann, Paris (FR)

(73) Assignee: Institut Francais du Pétrole, Rueil-Malmaison (FR)

( * ) Notice: Subject to any disclaimer, the term of this patent is extended or adjusted under 35 U.S.C. 154(b) by 0 days.

(21) Appl. No.: 09/725,510

(22) Filed: Nov. 30, 2000

(30) Foreign Application Priority Data

Nov. 30, 1999 (FR) .............................. 99 15227

(51) Int. Cl.$^7$ ........................ C07C 15/20; C07C 5/367
(52) U.S. Cl. ................... 585/430; 585/431; 585/432
(58) Field of Search ............................ 585/431, 430, 585/432

(56) References Cited

U.S. PATENT DOCUMENTS 3,652,231 A * 3/1972 Greenwood et al. ........ 422/223
5,792,338 A * 8/1998 Gosling et al. ............... 208/65

FOREIGN PATENT DOCUMENTS

FR 2 657 087 7/1991

OTHER PUBLICATIONS

French Search Report dated Aug. 16, 2000.

* cited by examiner

Primary Examiner—Thuan D. Dang
(74) Attorney, Agent, or Firm—MIllen, White, Zelano & Branigan, P.C.

(57) ABSTRACT

A moving bed process for producing aromatic compounds comprises at least a first step in which principally naphthene dehydrogenation is carried out in the presence of hydrogen in a mole ratio $(H_2)_1/(HC)$, said step being followed by at least one subsequent step carried out at a mole ratio $(H_2)_2/(HC)_2$, the process also comprising reducing the catalyst with hydrogen in a ratio $(H_2)_{red}/(HC)$. In accordance with the invention, $(H_2)_1/(HC)+(H_2)_{red}/(HC) \leq (H_2)_2/(HC)_2$, (HC) representing the molar quantity of feed in the first step and $(HC)_2$ that of the subsequent step, or $(H_2)_1/(HC)+(H_2)_{red}/(HC) > (H_2)_2/HC_2$, but where $(H_2)_1/(HC)$ is less than $(H_2)_2/(HC)_2$. Particular application to reforming.

14 Claims, 3 Drawing Sheets

Figure 1:
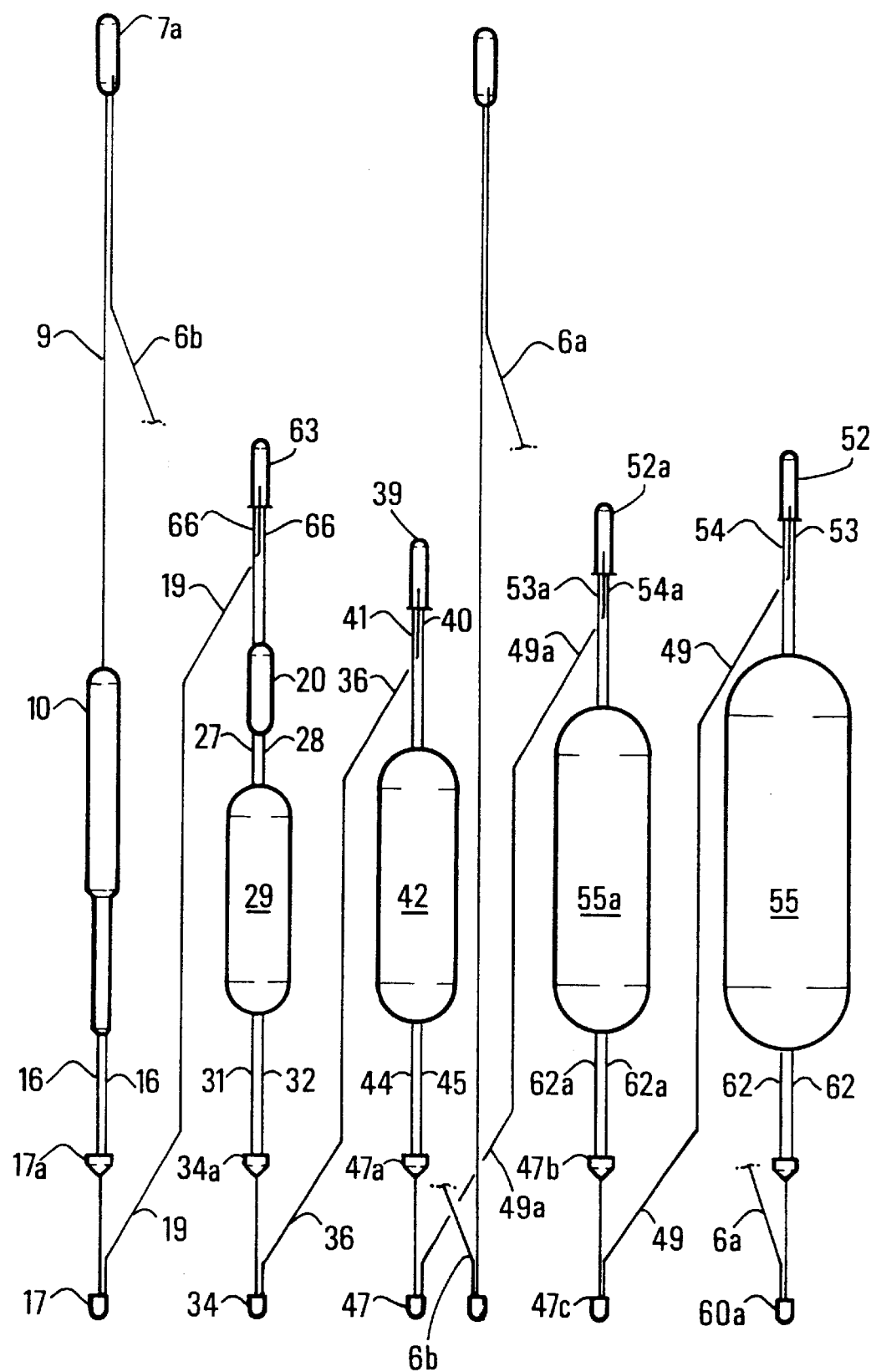

PROCESS FOR THE PRODUCTION OF AROMATIC COMPOUNDS IN A MOVING BED INCLUDING A REDUCTION OF THE CATALYST

The invention relates to moving bed processes for producing aromatic compounds from hydrocarbons, in which a hydrocarbon feed supplemented by a hydrogen-rich gas is transformed. More specifically, it relates to continuous reforming or still more specifically to BTX (Benzene, toluene, xylene) production with continuous catalyst regeneration.

More particularly, it relates to the step in which principally the naphthenes contain in the feed are dehydrogenated, i.e., the step carried out in the first reforming reactor, or to the production or aromatic compounds.

The catalyst generally comprises a support (for example formed from at least on refractory oxide, the support also possibly including one or more zeolites), at least one noble metal (preferably platinum), and preferably at least one promoter metal (for example tin or rhenium), at least one halogen and optionally one or more additional elements (such as alkalis, alkaline-earths, lanthanides, silicon, group IVB elements, non noble metals, group IIIA elements, etc.). As an example, such catalysts contain platinum and at least one other metal deposited on a chlorinated alumina support. In general, such catalysts are used to convert naphthenic or paraffinic hydrocarbons which can be transformed by dehydrocyclisation and/or dehydrogenation, in reforming or for the production of aromatic hydrocarbons (for example production of benzene, toluene, or ortho-, meta- or para-xylene). Such hydrocarbons originate from fractionating crude oil by distillation, or from other transformation processes such as catalytic cracking or steam cracking.

Such catalysts have been widely described in the literature.

Many chemical reactions occur during the reforming process. They are well known, reactions which are beneficial for the formation of aromatic compounds and improving the octane index which can be cited are naphthene dehydrogenation, cyclopentane ring isomerisation, paraffin isomerisation, paraffin dehydrocyclisation; the deleterious reactions include paraffin and naphthene hydrogenolysis and hydrocracking. The reaction rates of such a variety of reactions are very different and are highly endothermic for dehydrogenation reactions and exothermic for the other reactions. For this reason, the reforming process is carried out in a plurality of reactors which are subjected to varying temperature drops.

Experience has shown that naphthene dehydrogenation reactions occur in the first reactor or reactors.

Thirty years ago, reforming processes or aromatic production processes were carried out at 40 bars, while twenty years ago, it was 15 bars, and today's reforming reactors operate at pressures below 10 bars, in particular in the range 3 to 8 bars.

However, such a reduction in the hydrogen pressure is accompanied by more rapid catalyst deactivation by coking. Coke, a compound with a high molecular weight and primarily based on carbon and hydrogen, is deposited on the active sites of the catalyst. The H/C mole ratio of the coke formed is in the range about 0.3 to 1.0. The carbon and hydrogen atoms form condensed polyaromatic structures with a variable degree of crystallinity depending on the nature of the catalyst and the operating conditions employed in the reactors. While the transformation selectivity of hydrocarbons to coke is very low, the amount of coke which accumulates on the catalyst can be large. Typically, for fixed bed units, such amounts are in the range 2.0 to 20.0 or 25.5% by weight. For slurry reactor units, these amounts are in the range 3.0 to 10.0% by weight at the outlet from the last reactor. The coke is mainly deposited in the last or in the last two reactors.

Coke deposition, which is faster at low pressure, necessitates more rapid catalyst regeneration. Currently, regeneration cycles are as short as 2–3 days.

Many patents concern processes for reforming or producing aromatic compounds with continuous or sequential catalyst regeneration.

The processes employ at least two reactors in which a moving bed of catalyst circulates from top to bottom traversed by a feed composed of hydrocarbons and hydrogen, with the feed being reheated between each reactor.

Experience has shown that the first reactor is the home of rapid reactions producing large amounts of hydrogen.

The Applicant's French patent FR-A-2 657 087 describes such a reforming process.

FIG. 1 reproduced in this document (corresponding to FIG. 2 of FR-A-2 657 087) employs 4 reactors. An initial feed composed of hydrocarbons and hydrogen is circulated through at least two reaction zones disposed in series, side by side, each of these reaction zones being of the moving bed type, the feed circulating successively in each reaction zone, and the catalyst also circulating in each reaction zone and flowing continuously in the form of a moving bed from top to bottom in each zone, the catalyst being withdrawn from the bottom of each reaction zone and being transported in a stream of hydrogen to the top of the next reaction zone, the catalyst that is continuously withdrawn from the bottom of the last reaction zone traversed by the feed then being sent to a regeneration zone.

Referring to FIG. 1, the feed composed of hydrocarbons and hydrogen in a set $H_2/HC$ ratio traverses reactor 1 (29) and is re-heated, traverses reactor 2 (42), is re-heated traverses reactor 3 (55a), is re-heated, traverses reactor 4 (55), and is sent to a separation section.

The catalyst drops into reactor 1 (29), is traversed by the feed and is withdrawn from (29) via lines (31) and (32). It is recovered in a hopper (34a), lifted to the upper surge drum (39) of reactor 2 via a lifting means (34) and (36), it flows from the surge drum (39) via lines (40) and (41) towards reactor 2 (42); it is withdrawn from (42) via lines (44) and (45), is recovered in a hopper (47a), lifted to upper surge drum (52a) of reactor 3 via a lifting means (47) and 49a); it flows from the surge drum (52a) via lines (53a) and (54a) towards reactor 3 (55a); it is withdrawn from (55a) via lines (62a), is recovered in a hopper (47b), lifted to upper surge drum (52) of reactor 4 via a lifting means (47c) and (49); it flows from the surge drum (52) via lines (53) and (54) towards reactor 4 (55); it is withdrawn from (55) via lines (62), is recovered in a hopper, lifted to upper surge drum (7a) of regenerator (10) via a lifting means (60a), (6a) and (6b); it flows from this surge drum (7a) via line (9) towards regenerator (10); it is withdrawn from (10) via lines (16) and is recovered in a hopper (17a), lifted to upper surge drum (63) of reactor 1 via a lifting means (17) and (19); it flows from this surge drum (63) via a line (66) to a reduction drum (20) where the catalyst at least partially regains it metallic form; finally, it flow via lines (27) and (28) towards reactor 1 (29).

The feed in the reactor(s) for reforming or producing aromatic compounds is generally treated at pressures of 0.1 to 4 MPa, preferably 0.3–0.8 MPa, 400–700° C., preferably 480–600° C., at space velocities of 0.1 to 10 $h^{-1}$, preferably 1–4 h$^{-1}$, and with recycled hydrogen/hydrocarbon (mole) ratios of 0.1 to 10, preferably 3–10, more particularly 3–4 for regenerative reforming and 4–6 for the aromatic compound production process.

Traditionally, after the last reactor, a first separation is carried out between the hydrocarbons and a recycled hydrogen which is re-injected into fresh feed.

The non-recycled effluent undergoes a separation process to produce hydrogen known as exported hydrogen, which may contain up to 10% by volume or preferably 4% by volume of light hydrocarbons such as ethane and propane. By comparison, recycle hydrogen can contain more than 10%, generally more than 12% or 15% by volume of $C_2^+$, $C_2H_4$ to $C_{10}$ aromatic compounds.

The coked catalysts are regenerated.

The catalyst is generally regenerated in three principal steps:

(a) a combustion step wherein the coke is eliminated by burning with an oxygen-containing gas;

(b) a halogenation step wherein the catalyst is flushed with a halogenated gas to re-introduce halogen into the catalyst and re-disperse the metallic phase;

(c) a drying or calcining step, which eliminates the water produced by coke combustion from the catalyst.

It is completed by a reduction step wherein the catalyst is reduced prior to introducing the feed, which is generally carried out between the regenerator (where steps a, b, c are carried out) and the first reactor where the reaction takes place.

Reduction consists of chemical transformation of the metallic phase contained in the catalyst. After preparing the catalyst or after the calcining step undergone by the catalyst undergoing regeneration, the metal or metals are present on the catalyst surface in the form of the oxide or the oxychloride, which are practically inactive, catalytically speaking. Before injecting the hydrocarbon feed to be treated, it is thus vital for the catalyst to be reduced.

In practice, such reduction is carried out at high temperature (between 300–800° C., more generally 450° C. to 550° C.) in the presence of exported or purified hydrogen, and for periods generally in the range from a few minutes to a few hours. The purified hydrogen originates from an exported hydrogen purification unit. It generally contains less than 1% by volume of $C_2^+$.

Thus a purified or exported hydrogen gas is supplied for reduction and which is then withdrawn and lost once the reduction operation is complete, and a (non purified) recycle hydrogen is supplied for the reaction in a $H_2$/HC ratio which is unique to the reforming unit.

More precisely, the present invention concerns a process for producing aromatic compounds from a hydrocarbon cut using a catalyst circulating in a moving bed, the process comprising at least the following successive steps:

a first step for treating the cut employing a naphthene dehydrogenation reaction carried out in the presence of hydrogen in a ratio $(H_2)_1$/HC, where $(H_2)_1$ represents the molar quantity of pure hydrogen introduced into said first step and HC represents the molar quantity of feed introduced into said first step;

followed by at least one subsequent treatment step carried out in the presence of hydrogen in a mole ratio $(H_2)_2$/$(HC)_2$, where $(H_2)_2$ represents the molar quantity of pure hydrogen introduced into said subsequent step and $(HC)_2$ represents the molar quantity of feed entering said subsequent step;

separating the gaseous hydrogen-containing effluent from the liquid product and from the catalyst, recycling at least a portion of the gaseous hydrogen-containing effluent, termed the recycle gas, to said first treatment step;

regenerating and reducing the catalyst then re-introducing the catalyst into said first treatment step, reduction taking place in the presence of hydrogen in a mole ratio $(H_2)_{red}$/HC where $(H_2)_{red}$ represents the quantity of pure hydrogen introduced into the reduction step;

in which process the sum of the mole ratios $(H_2)_1$/HC+ $(H_2)_{red}$/HC is less than or equal to the mole ratio $(H_2)_2$/$(HC)_2$, or $(H_2)_1$/$(HC)_2$+$(H_2)_{red}$/$(HC)$ is greater than $(H_2)_2$/$(HC)_2$, but where $(H_2)_1$/$(HC)$ is less than $(H_2)_2$/$(HC)_2$.

In the present invention, it is also possible to use recycle hydrogen for reduction. This disposition can increase the available quantity of exported hydrogen—a product with a high added value—and can also if necessary do away with purifying the hydrogen from the reforming process.

The reduction step is generally carried out at 300–800° C., preferably 400–600° C., with the catalyst residence time being 15 min to 2 hours, preferably 30 min to 1 hour 30 minutes.

The aromatic compound production process (and more particularly the zone in which the naphthene dehydrogenation reaction is principally accomplished) is carried out at 400–700° C., at 0.1–0.4 MPa, with space velocities of 0.1–10 h$^{-1}$, with $H_2$/HC mole ratios of 0.1 to 10.

Advantageously, reforming is carried out at 0.3–0.8 MPa, at 480–600° C., with space velocities of 1–4 h$^{-1}$ and with preferred $H_2$/HC ratios of at most 4 or even at most 2 in the step involving dehydrogenation.

BTX aromatic compounds are advantageously produced at 0.3–0.8 MPa, at 480–600° C. with space velocities of 1–4 h$^{-1}$ and with preferred $H_2$/HC ratios of at most 6 or even at most 3 in the step involving dehydrogenation.

The treatment step can be conducted in one or more zones; thus for the reforming shown in FIG. 1, four treatment zones are used.

The invention thus pertains to the naphthene dehydrogenation step essentially carried out in the first zone (or first reactor) of the treatment step. A plurality of sections (or zones or reactors) can be used to carry out each step.

The invention will be better explained with reference to FIG. 2.

The catalyst circulates from regenerator (106) to the upper surge drum (101) of the first reactor (103), via a transfer means (107) which, for example, is a lift (107); it falls under gravity via lines (108) towards the reduction zone (102). This reduction zone can be axial or radial and can comprise one or more sections. The catalyst leaving the reduction zone passes via line(s) (109) into the first reactor (103) from which it is withdrawn via lines (110); it is then sent to the upper surge drum (104) of the second reactor (105) via a transfer means (111), advantageously a lift.

The hydrogen-containing gas used for the reduction step is supplied via line (112). Advantageously, it is supplied at the temperature of the reduction step, via at least one heating means (113). The resulting stream (114) reduces the catalyst in chamber (102). A stream (115) leaves.

A hydrogen-containing gas supplied via at least one line (117) is added to the feed supplied via at least one line (116) and the resulting stream enters the first reactor via line (119), in which reactor the naphthene dehydrogenation reactions principally take place.

Define $(H_2)_1$ as the quantity in moles of hydrogen (expressed as pure hydrogen) supplied to the first reactor (103) (excluding any hydrogen which may originate from reduction) via line (119);

$(H_2)_{red}$ as the quantity in moles of hydrogen (expressed as pure hydrogen) provided to reactor (102) via line (114);

$(H_2)_2$ as the quantity in moles of hydrogen (expressed as pure hydrogen) supplied to reactor (105) in which the subsequent step occurs (not principally including naphthene dehydrogenation reactions);

(HC) as the quantity in moles of feed entering the first reactor;

$(HC)_2$ as the quantity in moles of feed entering the reactor for the subsequent step (105).

Figure 2:
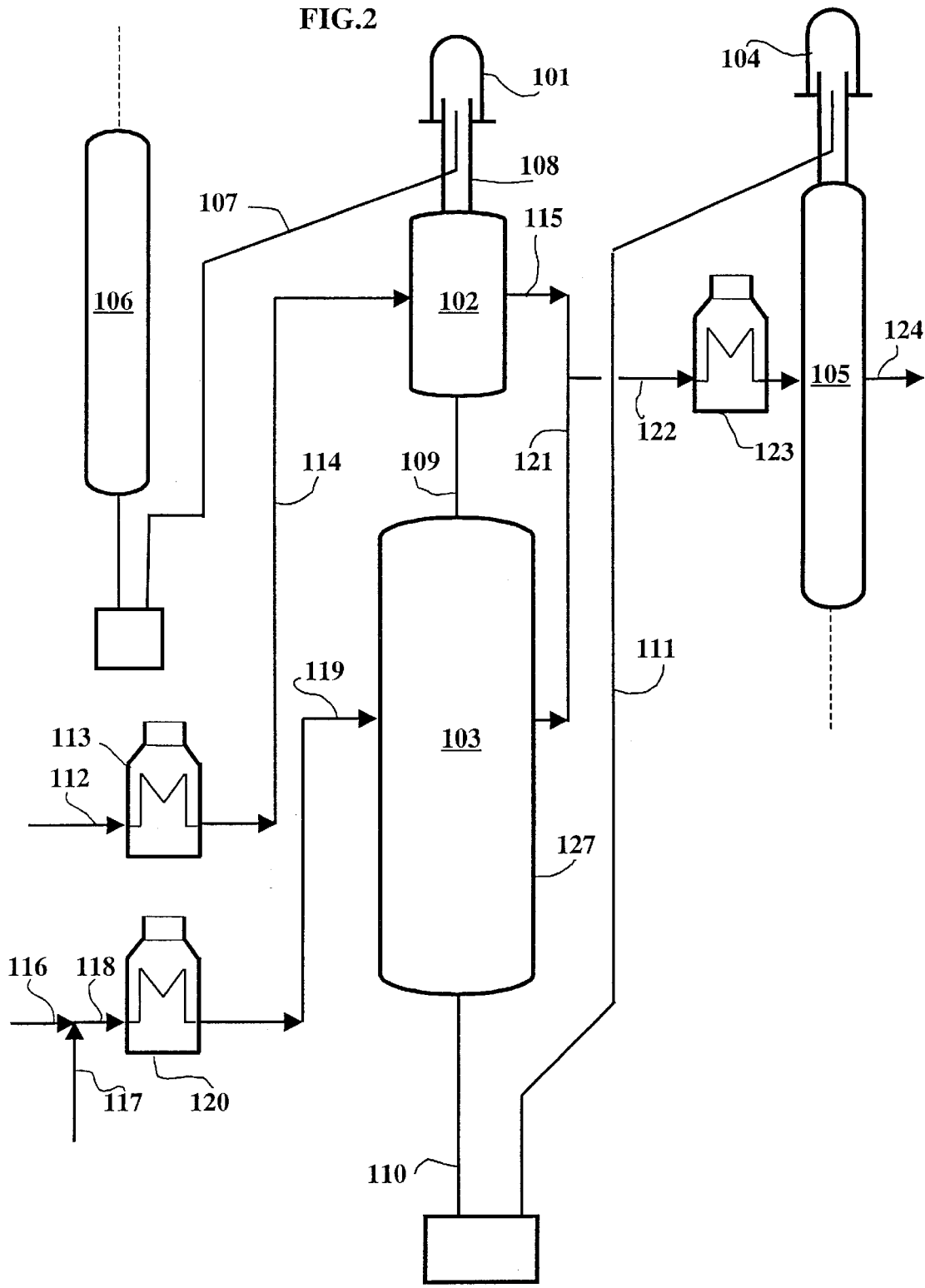

In FIG. 2 $(HC)_2$ is equal to HC since all of the effluent from the first reactor is treated in the second reactor. It is possible to envisage the case where only a portion of the effluent from the first step is treated in the subsequent step, and the case where feed is added to the effluent from the first step prior to the reactor for the subsequent step.

In accordance with the invention, the quantity $(H_2)_1$ is such that:

$$1) \quad \frac{(H_2)_1}{HC} + \frac{(H_2)_{red}}{HC} \leq \frac{(H_2)_2}{(HC)_2}$$

and preferably, the gaseous effluent from the reduction step is introduced into said first step and/or into at least one subsequent step following dehydrogenation, $$\text{or } 2) \quad \frac{(H_2)_1}{HC} + \frac{(H_2)_{red}}{HC} > \frac{(H_2)_2}{(HC)_2} \text{ but where } \frac{(H_2)_1}{HC} < \frac{(H_2)_2}{(HC)_2}$$

In general, at least a portion of the gaseous effluent from the reduction step is extracted from the unit without passing through any of said steps. Preferably, the gaseous effluent from the reduction step is introduced into said first step and/or into at least one subsequent step following dehydrogenation.

In general, $(H_2)_1/HC$ is at most 10, Preferably 0.1 to 10.

All quantities are expressed in moles. The quantity $(H_2)$ is expressed as pure hydrogen but the hydrogen-containing gas used may be based on purified hydrogen, exported hydrogen or, as is preferable, recycle hydrogen.

The quantity of hydrogen supplied to the reduction step (calculated as pure hydrogen) is selected such that the HSV with respect to the catalyst is in the range 1 to 10 kg of hydrogen/kg of catalyst/h, preferably in the range 2 to 6 kg of hydrogen/kg of catalyst/h. The flow rate of the gas is sufficient to eliminate the heat supplied by any $C_2^+$ hydrocarbon cracking reactions contained in the reduction gas.

The quality of the hydrogen is less critical than in the prior art. Thus advantageously, a gas can be used for reduction which may contain large quantities of impurities, for example 15% by volume of $C_2^+$ (recycle hydrogen). However, the use of purified or exported hydrogen is also included in the scope of the invention.

It should be noted that the ratio $(H_2)_2/(HC)_2$ defined above is the ratio conventionally used in the treatment process, more particularly that used in the prior art in the first zone. Thus preferably, it is 2–4 for reforming and 3–6 for aromatic compound production.

This means that the ratio $(H_2)_1/HC$, in the treatment zone where the naphthene dehydrogenation reaction occurs, is lower than the ratio $H_2/HC$ of the prior art when (FIG. 2) the hydrogen supplied for reduction is withdrawn from the reduction step and does not pass into said zone (except for the small amount that passes along with the moving catalyst bed). Clearly in this case, hydrogen is generally added to the feed entering said subsequent step.

Thus when implementing the invention, the ratio $(H_2)_1/HC$ in said zone has been able to be reduced and as a result, the naphthene dehydrogenation reaction is favoured.

Advantageously, stream (118) is supplied at the reaction temperature of the first reactor (103) by at least one heating means (120). The resulting stream (119) reacts in reactor (103) and produces an effluent (121).

Preferably, the gas streams (115) and (121) are mixed in a line (122) and constitute the feed for the next reactor (105), which is advantageously supplied at the reaction temperature by means of at least one heating means (123). In this preferred disposition, mixing the reduction hydrogen effluent with the effluent from the first reactor can produce a ratio $(H_2)_2/(HC)_2$ at the inlet to the second reactor that may be higher than in the prior art, thus encouraging hydrocarbon transformation after dehydrogenation.

Thus the gaseous effluents from reduction and the step implementing dehydrogenation are introduced into at least one step following dehydrogenation. This includes arrangements in which a portion of the effluent is introduced into a subsequent step (for example the second reactor), a further portion of the effluent (or the remaining portion) being introduced into a further subsequent step (for example a $3^{rd}$ reactor).

It is even possible to add recycle gas (or any other hydrogen) to said step following dehydrogenation.

More generally, at least a portion of the gaseous effluent from reduction can be introduced in the step implementing dehydrogenation and/or at least one step following dehydrogenation.

The effluent leaving reactor (105) via line (124) is then treated in a conventional treatment process; for example, it is sent to a third treatment zone, or it may be withdrawn, etc . . . . The same is true for the catalyst.

The invention thus consists of diminishing the supply of hydrogen via line (119) in the first zone of the treatment step, if compared with the prior art, and increasing the quantity of hydrogen in the reduction step. In all cases, the quantity of hydrogen used for reduction is controlled.

This quantity of hydrogen used for reduction can be adjusted to the operator's requirements. It may correspond to maintaining the global $H_2/HC$ ratio (reduction+1st reactor). It may reach a globally higher $H_2/HC$ ratio while maintaining a hydrogen deficit in the first reactor. This results in maintaining the $H_2/HC$ ratio (with respect to the prior art) in the second reactor (after major dehydrogenation of the naphthenes), or in an increase in this ratio, favouring other reactions. Supplemental hydrogen can also be injected.

This provides major advantages:

(a) a large flow rate of hydrogen with respect to the quantity of catalyst in the reduction zone which limits deletrious thermal effects of hydrogenolysis and hydrocracking of $C_2^+$ hydrocarbons which may be present in the hydrogen used for reduction, such that the process of the invention can function with recycle hydrogen and in the absence of purification.

(b) The first reactor is the primary seat of naphthene dehydrogenation reactions (for the reforming units or for the production of aromatic compounds) which are strong hydrogen producers; a reduction in the quantity of hydrogen introduced into the feed for this first reactor favours these dehydrogenation reactions which are more rapid. Despite these reactions that are more favourble to coking, it has been shown that coking has no time to develop in a manner which is substantial with respect to the prior art situation.

From the operator's viewpoint, the advantages of the invention result from:

(a) the possibility of using a less pure hydrogen for reduction and limiting the residence time in the reduction zone;

(b) limiting dechlorination and metallic sintering in the reduction zone, and thus increasing the service life of the catalyst;

(c) optimising the $H_2$/HC ratio in the first reactor which reduces the quantity of catalyst necessary in this first reactor for naphthene dehydrogenation.

A preferred apparatus for carrying out the process of the invention is an apparatus for producing aromatic compounds from a hydrocarbon cut using a catalyst circulating in a moving bed, comprising:

at least one zone, the first zone, for treating the cut involving a naphthene dehydrogenation reaction, said zone being provided with at least one line for introducing the cut and at least one line for introducing a hydrogen-containing gas, and also comprising at least one gaseous stream withdrawal line;

at least one subsequent treatment zone located after said first zone and comprising at least one line supplying feed to said subsequent zone, and at least one line for withdrawing a gaseous effluent;

at least one zone for separating catalyst, liquid product and gaseous hydrogen-containing effluent located after said treatment zones;

at least one catalyst regenerating zone;

at least one zone for reducing regenerated catalyst connected to said zone carrying out naphthene dehydrogenation such that the reduced catalyst enters said dehydrogenation zone, said reduction zone being provided with:

at least one line for introducing hydrogen-containing gas;

and at least one line for extracting a gas stream;

at least one line for recycling at least a portion of the gaseous hydrogen-containing effluent from said separation zone to said zone carrying out the dehydrogenation reaction;

in which apparatus the line for withdrawing a gaseous stream from the reduction zone is connected to at least one line supplying feed to the subsequent zone.

Preferably, the apparatus also comprises at least one line for recycling at least a portion of the gaseous hydrogen-containing effluent obtained in the separation zone to said reduction zone.

In the case of the production of aromatic compounds envisaged here, the line for withdrawing the treated cut from any of the treatment zones is the same as the line for withdrawing gaseous effluents, the reaction taking place in the gas phase.

Clearly, since the catalyst bed circulates in a moving bed, each zone is provided with a means for supplying catalyst and a means for withdrawing it.

Advantageously, the line for introducing a hydrogen-containing gas is also connected to a line supplying recycled gaseous effluent.

Particularly advantageously, the invention provides an apparatus for carrying out the process of the invention. This apparatus is a vessel (reactor) comprising a reduction zone followed (in the direction of flow of the catalyst) by a zone for dehydrogenation.

More precisely, the invention concerns a reactor for treating a hydrocarbon cut using a catalyst circulating in a moving bed, comprising at least one line for introducing a catalyst to the top of the reactor and at least one line for withdrawing catalyst located at the bottom of the reactor, and comprising at least one zone (103) for treating the cut by a dehydrogenation reaction, said zone being provided with at least one line (119) for introducing the cut, at least one line (121) for withdrawing said treated cut and gaseous effluent, said zone further comprising at least one line (117, 119) for introducing a hydrogen-containing gas, in which reactor said treatment zone is located in the lower portion of the reactor, the upper portion comprising at least one catalyst reduction zone (102) provided with at least one line (114) for introducing hydrogen-containing gas.

Figure 3:
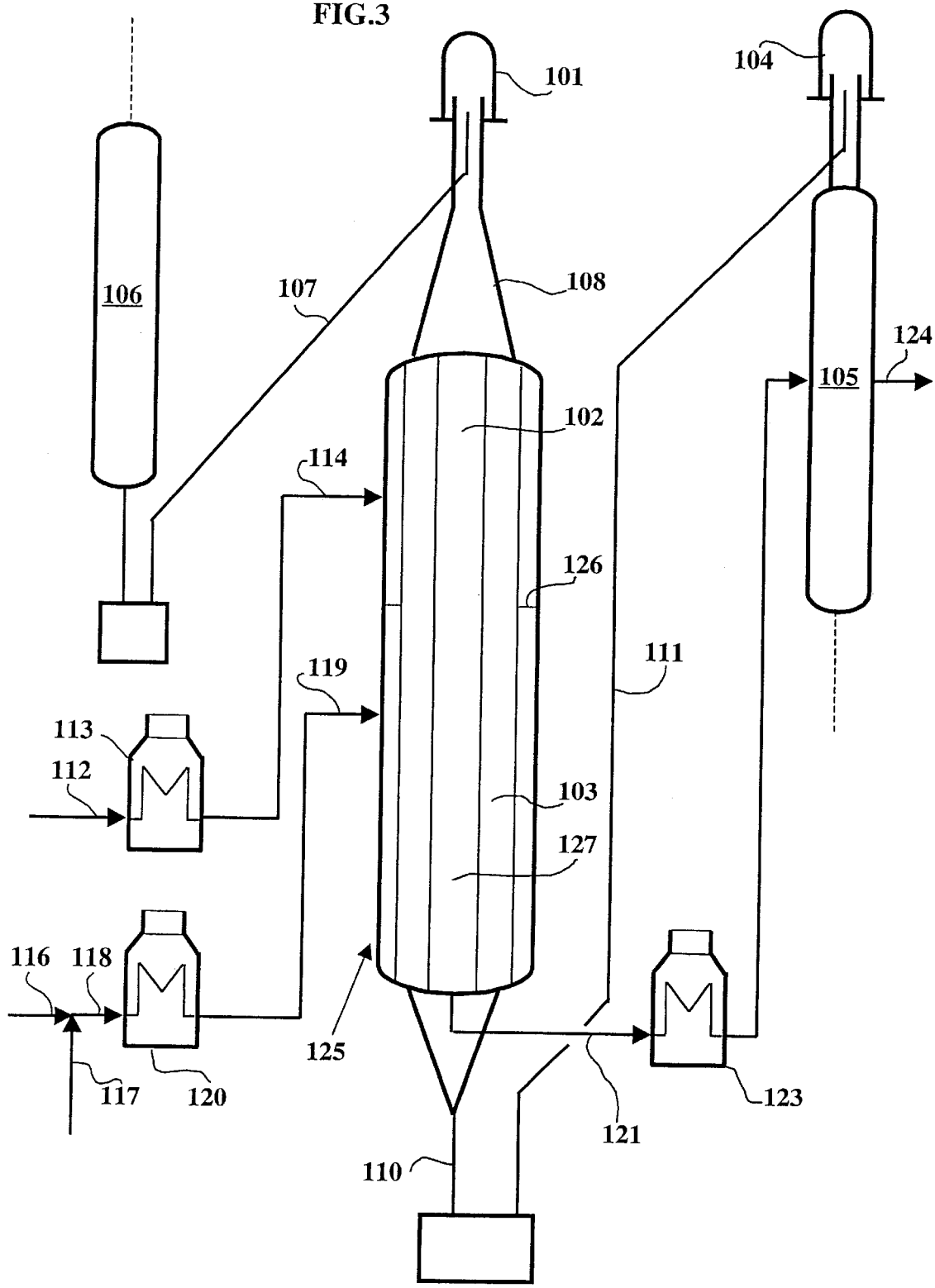

FIG. 3 shows such a reactor. The figure shows a radial bed apparatus.

Because of the importance of the hydrogen flow rate and the pressure drop resulting in an axial bed, a radial bed may be preferred, but axial bed arrangements are also encompassed within the scope of the invention.

The catalyst circulates from regenerator (106) to the upper surge drum (101) of the first reactor (125), via a transfer means (107) which, for example, is a lift (107); it falls under gravity via lines (108) towards the reduction zone (102). This reduction zone can be axial or radial and can comprise one or more sections. The catalyst leaving the reduction zone passes into the zone carrying out dehydrogenation (103) located in reactor (125) from which it is withdrawn via lines (110); it is then sent to the upper surge drum (104) of the second reactor (105) via a transfer means (111), advantageously a lift.

The hydrogen-containing gas used for the reduction step is supplied via line (112). Advantageously, it is supplied at the temperature of the reduction step, via at least one heating means (113). The resulting stream (114) reduces the catalyst in zone (102). After radially traversing the catalytic bed from the exterior to the interior of the rector, the gaseous effluent is collected in the central collector (127).

A hydrogen-containing gas supplied via at least one line (117) is added to the feed supplied via at least one line (116) and the resulting stream enters the first reactor via line (119), in which reactor the naphthene dehydrogenation reactions principally take place.

Advantageously, stream (118) is brought to the reaction temperature of zone (103) by at least one heating means (120). The resulting stream (119), traversing the bed from the exterior to the interior of the reactor, reacts in zone (103).

The resulting gaseous effluent is collected in the central collector (127).

The gaseous effluents from reduction zone (102) and the treatment zone carrying out dehydrogenation (103) are withdrawn as a mixture via line (121), and constitute the feed for the next reactor (105), which feed is advantageously brought to the reaction temperature by at least one heating means (123).

Mixing of the gases entering into each zone is advantageously avoided by using a means (126) (for example a plate) for separating said zones.

In the arrangement shown in FIG. 3, the gaseous effluents are mixed in the central collector (127). In a variation, their mixing in the reactor is avoided by using a means for separating said zones located in the collector. The gaseous effluents are then separately withdrawn from each zone, the reactor then including at least one line for withdrawing the gaseous effluent from the reduction step.

We have described radial circulation of the gas over the catalytic bed from the exterior to the interior of the reactor, but circulation in the reverse direction is also encompassed within the scope of the invention.

Preferred application are reforming and BTX production.

The apparatus comprising said reactor also forms part of the invention.

Advantageous embodiments are as follows:

(1) the whole of the gaseous effluent from the reduction step is sent to said first step and the whole of it is sent to said subsequent step;

(2) the gaseous effluents from the reduction step and said first step are separately withdrawn then sent as a whole to said subsequent step (FIG. 2);

(3) a portion of the gaseous effluent from the reduction step is sent to said first step; the other portion is sent to said subsequent step, mixed with the gaseous effluent from said first step (the gaseous effluent from the reduction step can be sent to one or more subsequent steps);

(4) a portion of the gaseous effluent from the reduction step is sent to at least one subsequent step and/or to the first step, the remainder being withdrawn from the unit without passing through any of said treatment steps;

(5) all of the gaseous effluent from the reduction step is withdrawn without passing through any of said treatment steps; hydrogen is added to the feed entering said subsequent step.

It should be noted that for all of these arrangements, the ratio $(H_2)_2/HC$ in the first step is always lower than that in said subsequent step.

It should also be noted that, in general, at least a portion of the gaseous effluent from the reduction step is introduced into at least one treatment step of the process (first step, subsequent step).

In all of the advantageous arrangements cited above, hydrogen can always be added outside the process.

The following example illustrates the invention without limiting its scope.

A catalyst circulated at 800 kg/h and 90839 kg/h of feed were treated. Reduction was carried out with 18294 kg/h of an 83.7% by volume pure hydrogen-rich gas with a molar mass of 9.6 kg/kmole, with an $H_2$ HSV of 4 h$^{-1}$, and with a catalyst residence time of 1 hour. The $(H_2)_{red}/HC$ ratio was 2.07. In the first treatment zone (first reactor), 9976 kg/h of a 83.7% by volume pure hydrogen-rich gas with a molar mass of 9.6 kg/kmole was injected into a 90839 kg/h feed. Thus the $(H_2)_1/HC$ ratio was 1.13.

In the prior art, for the same feed and catalyst flow rate, a recycle gas with a molar mass of 9.6 kg/kmole containing 83.7% by volume of hydrogen was injected into the first reactor at a flow rate of 28270 kg/h. All of the effluent passed into the second reactor. The resultant mole ratio $(H_2)_2/HC$ was 3.2. Reduction was carried out with a 92.1% by volume hydrogen-rich gas, with a molar mass of 4.4 kg/kmole at a flow rate of 600 kg/h, with a residence time of 2 hours for the catalyst.

It can be seen that using the process of the present invention, a non-purified hydrogen containing more than 10% by volume of impurities, and generally more than 15% by volume, can be used both in the present reforming reactor and in the reducing reactor; and the flow rate of the hydrogen-rich gas injected into the feed for the first reactor is less than the quantity added for reduction.

These conditions can be adjusted.

When a $(H_2)/_1/HC$ ratio of less than 1.1 is desired, the remaining hydrogen-rich gas (which has not been injected into the feed that enters the first reactor) has to be injected into the effluent from the first reactor before it enters the second reactor.

If a higher $(H_2)_1/HC$ is desired in the first reactor, it is possible to reduce the flow rate of the reduction $H_2$. Thus with an $H_2$ HSV in the reduction zone of 2 h$^{-1}$, for example, it is possible to operate under the conditions of the example with a $(H_2)_1/HC$ ratio of 1.4 in the first reactor.

It is possible to have a residence time and a reduction $H_2$ HSV and a $(H_2)_1/HC$ ratio in the first reactor such that the case of the example is not applicable. It is possible for the quantities of reduction hydrogen and hydrogen injected into the feed not to be sufficient to have a suitable $(H_2)_1/HC$ ratio at the inlet to the second reactor. In this case, it is possible to provide for supplemental injection of a hydrogen-rich gas into effluents leaving the first reactor, or at least into the feed for the second reactor.

What is claimed is:

1. A process for producing aromatic compounds from a hydrocarbon cut using a catalyst circulating in a moving bed, the process comprising at least the following successive steps:

a first step for treating the cut employing a naphthene dehydrogenation reaction carried out in the presence of hydrogen in a ratio $(H_2)_1/HC$ where $((H_2)_1$ represents the molar quantity of pure hydrogen expressed as hydrogen introduced into said first step and HC represents the molar quantity of feed introduced into said first step;

followed by at least one subsequent treatment step carried out in the presence of hydrogen in a mole ratio $(H_2)_2/(HC)_2$, where $(H_2)_2$ represents the molar quantity of hydrogen expressed as pure hydrogen introduced into said subsequent step and $(HC)_2$ represents the molar quantity of feed entering said subsequent step;

separating the gaseous hydrogen-containing effluent from the liquid product and the catalyst, recycling at least a first portion of the gaseous hydrogen-containing effluent containing at least 10% by volume of impurities, termed the recycle gas, to said first treatment step;

regenerating and reducing the catalyst then re-introducing the catalyst into said first treatment step, reduction taking place in the presence of hydrogen in a mole ratio $(H_2)_{red}/HC$ where $(H_2)_{red}$ represents the quantity of hydrogen expressed as pure hydrogen introduced into the reduction step;

characterized in that at least a second portion of the recycle gas is recycled to the reduction step and in a sufficient volume so as to eliminate substantially all heat caused by cracking of impurities and so that the gas entering the reduction step contains at least 10% by volume impurities.

2. A process according to claim 1, characterized in that at least a portion of the gaseous effluent from the reduction step is introduced into said first step and/or into at least one subsequent step following dehydrogenation.

3. A process according to claim 1, wherein the sum of mole ratios $(H_2)_1/HC$ and $(H_2)_{red}/HC$ is less than or equal to the mole ratio $(H_2)_2/(HC)_2$, the whole of the gaseous effluent from the reduction step being introduced into said first step and/or into at least one subsequent step following dehydrogenation.

4. A process according to claim 1, in which $(H_2)_1/HC$ is less than $(H_2)/(HC)_2$, and the sum of the mole ratios $(H_2)_1/HC$ and $((H_2)_{red}/HC$ is greater than the mole ratio $(H_2)_2/(HC)_2$, and at least a portion of the gaseous effluent from the reduction step is withdrawn without passing into any treatment step.

5. A process according to claim 1, characterized in that the treatment steps are carried out at 400–700° C., at 0.1–4 MPa, with space velocities of 0.1–10 h$^{-1}$ and with $(H2)_1/HC$ mole ratios of 0.1 to 10 in the step implementing dehydrogenation.

6. A process according to claim 1, comprising reforming, and implementing said naphthene dehydrogenation under 0.3–0.8 MPa, at 480–600° C., with space velocities of 1–4 $h^{-1}$ and with $(H2)_1/HC$ ratios of at most 4.

7. A process according to claim 5, in which the $(H2)_1/HC$ ratio is at most 2.

8. A process according to claim 1, comprising aromatic compound production and implementing said naphthene dehydrogenation at 0.3–0.8 MPa, at 480–600° C., with space velocities of 1–4 $h^{-1}$ and $(H2)_1/HC$ ratios of at most 6.

9. A process according to claim 8, in which the $(H2)_1/HC$ ratio is at most 3.

10. A process according to claim 1, characterized in that a portion of said recycle gas is added to said step following dehydrogenation.

11. A process according to claim 1, in which the quantity of hydrogen supplied to the reduction step is 1–10 kg/kg of catalyst/h.

12. A process according to claim 1, wherein the recycle gas contains more than 15% by volume of impurities.

13. A process according to claim 1, wherein the recycle gas contains more than 12% by volume of $C_2+$, $C_2H_4$ to $C_{10}$ aromatic compounds.

14. A process according to claim 1, wherein the recycle gas contains more than 15% by volume of $C_2+$, $C_2H_4$ to $C_{10}$ aromatic compounds.

* * * * *

UNITED STATES PATENT AND TRADEMARK OFFICE
CERTIFICATE OF CORRECTION

PATENT NO. : 6,660,895 B1
DATED : December 9, 2003
INVENTOR(S) : François-Xavier Brunet et al.

It is certified that error appears in the above-identified patent and that said Letters Patent is hereby corrected as shown below:

Column 10,
Line 20, reads "$((H_2)_1$" should be -- $(H_2)_1$ --
Line 59, reads "$((H_2)_{red}$" should be -- $(H_2)_{red}$ --
Line 65, reads "$(H2)_1$" should be -- $(H_2)_1$ --

Column 11,
Lines 4, 5, 10 and 11, reads "$(H2)_1$" should be -- $(H_2)_1$ --
Line 5, reads "claim 5" should read -- claim 6 --

Signed and Sealed this

Tenth Day of August, 2004

JON W. DUDAS
*Acting Director of the United States Patent and Trademark Office*